United States Patent [19]

Kostrzewa et al.

[11] 4,044,198

[45] Aug. 23, 1977

[54] METHOD FOR COLD-MILLING CELLULOSE DERIVATIVES

[75] Inventors: Michael Kostrzewa, Wiesbaden; Arno Holst, Wiesbaden-Biebrich; Gerhard Buchberger, Auringen, all of Germany

[73] Assignee: Hoechst Aktiengesellschaft, Germany

[21] Appl. No.: 556,053

[22] Filed: Mar. 6, 1975

[30] Foreign Application Priority Data

Mar. 7, 1974 Germany .............................. 2410789

[51] Int. Cl.$^2$ .............................................. C08B 11/00
[52] U.S. Cl. ......................................... 536/86; 536/56
[58] Field of Search ................ 260/232, 212, 230; 536/86, 56

[56] References Cited

U.S. PATENT DOCUMENTS

| 2,057,163 | 10/1936 | Richter | 260/232 |
|---|---|---|---|
| 2,160,106 | 5/1939 | Maxwell | 260/232 |
| 2,288,200 | 6/1942 | Meyer | 260/232 |
| 2,331,864 | 10/1943 | Swinehart et al. | 260/232 |
| 2,331,865 | 10/1943 | Swinehart et al. | 260/232 |
| 2,833,758 | 5/1958 | Köhler et al. | 260/232 |
| 3,251,824 | 5/1966 | Battista | 260/232 |
| 3,428,584 | 2/1969 | Riley | 260/232 |

OTHER PUBLICATIONS

Scott, Cryogenic Engineering, D. Van Nostrand Company, New York, N.Y., 1959, pp. 268, 269 & 276–283.
Refrigeration and Air Conditioning Directory, 1965, p. 369.

*Primary Examiner*—Ronald W. Griffin
*Attorney, Agent, or Firm*—James E. Bryan

[57] ABSTRACT

This invention relates to an improvement in the method for the cold-milling of a cellulose derivative, in which the cellulose derivative is cooled by means of liquid nitrogen until it becomes brittle and the thus cooled cellulose derivative is milled in a mill, the improvement comprising cold-milling a cellulose derivative which is soluble or swellable in water and has a water content of between 40 and 150 percent by weight, based on its dry weight, and which is, at 20° C, able to absorb, during swelling, more than 150 percent by weight of water, based on its dry weight.

3 Claims, No Drawings

METHOD FOR COLD-MILLING CELLULOSE DERIVATIVES

The present invention relates to a method for cold-milling cellulose derivatives, in particular cellulose derivatives soluble or swellable in water. In the method, the cellulose derivative is cooled by means of liquid nitrogen until it becomes brittle, and the thus cooled cellulose derivative is milled in a mill.

It is known to comminute organic high-molecular weight materials, for example cellulose derivatives, at such a low temperature that they are embrittled. The cooling takes place by means of direct contact with liquid nitrogen and the mill is kept at so low a temperature, either by means of the cooled material or some other low-temparature cooling, that the material can be milled in its brittle state. High-polymer materials are embrittled when they have been cooled below the glass transition temperature of their amorphous parts. Material embrittled by means of cooling is not deformed when pulverized so that only sufficient energy for crushing is necessary for the milling.

For obvious reasons, dry or dried products so far have been milled according to the method of cold milling.

Furthermore, it is known to comminute cellulose derivatives soluble or swellable in water by milling them. The fibrous condition of the cellulose derivatives obtained from cellulose, however, considerably complicates their milling. Finely pulverized and well pourable methyl cellulose products so far have been produced, for example, by washing the raw product obtained in the etherification process nearly salt-free with hot water, drying it by centrifuging at a high temperature to 50 per cent by weight of water based on wet methyl cellulose (adequate to 100 per cent by weight of water based on dry methyl cellulose) and premixing the product obtained by kneading it with water at standard temperature, i.e. causing it to start to gelatinize. This has taken place so far with the product having a water content of 60 to 70 percent by weight (based on wet substance), adequate to 150 to 233⅓ per cent by weight based on dry substance, then it was densified, granulated, dried, milled, and sorted.

Apart from the circumstantial preparation of the material for the actual milling, the degree of fineness is relatively low with the known method.

The object of the present invention is to provide a method for comminuting cellulose derivatives soluble or swellable in water, in particular cellulose ethers, which method leads to a milled product having a high proportion of fine grain.

The method according to the invention involves cold-milling of a cellulose derivative which is soluble or swellable in water and has a water content of between 40 and 150 per cent by weight, based on its dry weight, and which is, at standard temperature (20°), able to absorb, during swelling, more than 150 per cent by weight of water, based on its dry weight.

The method of the invention can be carried out by known methods, for example by one of the methods described in the journal "Kunststoffe", volume 63 (1973), No. 10, pages 742 and 749 or in the journal "Mitteilungen der Industrie" 1973, No. 11, pages 694 to 696.

According to the invention, the cellulose ether is, because of its relatively high water content, comminuted to a considerably higher degree than when comminuted in its dry state. This is shown by the milling results given in the table below. They were obtained by centrifuging, and at the same time heating, a water-soluble cellulose ether (methyl cellulose), which had been washed nearly salt-free after the etherification reaction, to a water content of 50 per cent by weight based on wet substance (adequate to 100 per cent by weight based on dry substance) and then cold-milling it the first time directly, i.e. with a water content of 50 per cent by weight, based on wet substance, adequate to 100 per cent by weight based on dry substance (milling method A), and the second time by drying it to a water content of 10 per cent by weight, based on wet substance (adequate to about 11 per cent by weight based on dry substance) and then cold-milling it in the same apparatus (milling method B) and sifting the two ground and dried cellulose ether powders into fractions of a decreasing grain size.

Whereas 89.9 per cent of the total weight of the cellulose ether comminuted according to milling method A (method according to the invention) has a maximum grain size of not more than 0.3 mm, the corresponding figure in milling method B (cold-milling after drying) is only 51.4 per cent, the proportion having a grain size of not more than 0.2 mm is 81.4 per cent in milling method A, and only 41.1 per cent in milling method B.

The method according to the invention is advantageous even when it is employed after the cellulose derivative has, before the milling, been densified and granulated in known manner, for example in order to obtain a ground product having a higher bulk density. The table below gives the result of such a method under method C. In this method the same water-soluble cellulose ether was densified before the cold-milling by means of a screw press and a perforated disc and granulated in its wet state in a cross-beater mill (Condux-mill) having a wire basket. Then the coarse granulate (1.5 mm) having a water content of 50 per cent by weight, based on wet substance (adequate to 100 per cent by weight based on dry substance, was cold-milled according to the invention. The table shows that of the cellulose ether comminuted and dried (10 per cent by weight of water, based on wet substance), adequate to about 11 per cent by weight based on dry substance, according to milling method C, 90.9 per cent by weight has a grain size of not more than 0.3 mm and 67.9 per cent by weight has a grain size of not more than 0.2 mm.

The method of the invention has the advantages that it makes possible a very fine comminution of cellulose derivatives soluble or swellable in water and that it is highly effective. These advantages become particularly evident with the milling of non-ionic water-soluble cellulose ethers, such as methyl cellulose, methyl hydroxyethyl cellulose, methyl hydroxproply cellulose, hydroxyethyl cellulose, and hydroxypropyl cellulose, because it is especially difficult to comminute them by means of the known methods. The method according to the invention is therefore preferably employed in the comminution of non-ionogenic water-soluble cellulose ethers. Another advantage of the method is that the particles of ground cellulose have a fibrous structure, which has a favorable influence on the speed of solution of water-soluble cellulose ethers in water. This applies to non-cross-linked cellulose ethers as well as to those cellulose ethers which are cross-linked, for example with glyoxal, before or after the application of the milling method according to the invention in order to prevent as far as possible, the lumping of the particles when they are added to water during stirring.

TABLE

| width of mesh (mm) | 0.75 | 0.63 | 0.5 | 0.4 | 0.3 | 0.2 | 0.125 | 0.1 | 0.05 | 0.04 | 0.032 | 0.025 | smaller |
|---|---|---|---|---|---|---|---|---|---|---|---|---|---|
| Siftings, in Per Cent by Weight of the Total Quantity | | | | | | | | | | | | | |
| method A | 0.4 | 0.8 | 1.1 | 3.3 | 4.5 | 8.5 | 14.6 | 8.6 | 34.3 | 12.3 | 5.4 | 5.2 | 0.8 |
| method B | | | | 33.7 | 14.9 | 10.3 | 11.3 | 5.0 | 16.1 | | | | 8.5 |
| method C | 0.4 | 0.3 | 0.3 | 2.1 | 6.0 | 23.0 | 28.3 | 12.4 | 12.4 | 12.5 | 2.3 | 0 | 0 |

It will be obvious to those skilled in the art that many modifications may be made within the scope of the present invention without departing from the spirit thereof, and the invention includes all such modifications.

What is claimed is:

1. In the method for the cold-milling of a cellulose derivative, in which the cellulose derivative is cooled by means of liquid nitrogen until it becomes brittle and the thus cooled cellulose derivative is milled in a mill, the improvement comprising cold-milling to a milled product having a high proportion of fine grain, a cellulose derivative which is soluble or swellable in water and has a water content of between 40 and 150 per cent by weight, based on its dry weight, and which is, at 20° C, able to absorb, during swelling, more than 150 per cent by weight of water, based on its dry weight.

2. A method according to claim 1 in which the cellulose derivative which is cold-milled is a non-ionic water-soluble cellulose ether.

3. A method according to claim 1 in which the water content of the cold-milled cellulose derivative is reduced by heating it.

* * * * *